US008881054B2

(12) United States Patent
Bennett (10) Patent No.: US 8,881,054 B2
(45) Date of Patent: Nov. 4, 2014

(54) ONE STEP SELECTION OF DISABLED OPTIONS

(75) Inventor: Brian Elgaard Bennett, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/775,619

(22) Filed: May 7, 2010

(65) Prior Publication Data

US 2011/0276918 A1  Nov. 10, 2011

(51) Int. Cl.
*G06F 3/048* (2013.01)
*G06F 3/0482* (2013.01)

(52) U.S. Cl.
CPC .................................. *G06F 3/0482* (2013.01)
USPC .......................................................... 715/808

(58) Field of Classification Search
USPC ......................................................... 715/808
See application file for complete search history.

(56) References Cited

U.S. PATENT DOCUMENTS

| | | | |
|---|---|---|---|
| 6,628,311 B1 * | 9/2003 | Fang ............................... | 715/777 |
| 7,020,842 B1 * | 3/2006 | DeStefano et al. ............ | 715/741 |
| 7,099,561 B1 | 8/2006 | Lin et al. | |
| 2003/0038846 A1 | 2/2003 | Hori et al. | |
| 2005/0125744 A1 | 6/2005 | Hubbard et al. | |
| 2006/0235829 A1 * | 10/2006 | Mirzad et al. ...................... | 707/3 |
| 2007/0240057 A1 * | 10/2007 | Satterfield et al. ............. | 715/705 |
| 2008/0163342 A1 * | 7/2008 | Christopherson ................. | 726/4 |

FOREIGN PATENT DOCUMENTS

| | | |
|---|---|---|
| JP | 2001350552 A | 12/2001 |
| JP | 2008040596 A | 2/2008 |

OTHER PUBLICATIONS

"International Search Report", Mailed Date: Nov. 25, 2011, Application No. PCT/US2011/032810, Filed Date: Apr. 17, 2011, pp. 9.
"Disabling Inactive Menu Items", Retrieved at <<http://ignorethecode.net/blog/2008/07/01/disabling-inactive-menu-items/ >>, Jul. 1, 2008, pp. 3.
"Thoughts on Collaborative Planning", Retrieved at <<http://kswenson.wordpress.com/2006/08/19/please-dont-disable-my-menu-options/>>, Sep. 8, 2006, pp. 1-8.
Djärv, Jan., "Re: UI issue: Inactive Menu Entries and Icons", Retrieved at <<http://www.opensubscriber.com/message/emacs-devel@gnu.org/5680302.html>>, Dec. 28, 2006, pp. 2.
"Menus and Toolbars", Retrieved at <<http://java.sun.com/products/jlf/ed1/dg/higm.htm>>, 1999, pp. 16.
"How to Display ToolTip for Disabled Controls", Retrieved at <<http://www.devnewsgroups.net/group/microsoft.public.dotnet.framework.windowsforms/topic53273.aspx>>, Sep. 26, 2006, pp. 5.

* cited by examiner

*Primary Examiner* — Boris Pesin
*Assistant Examiner* — Angie Badawi
(74) *Attorney, Agent, or Firm* — Damon Rieth; Jim Ross; Micky Minhas (57) ABSTRACT

Information associated with an unavailable option is provided to a user upon detecting the user's interest in that option in a configuration environment or user interface control environment. The provided information may explain why the option is unavailable, what alternative options may be available, and which actions may be needed to render the option available. The user may be further enabled to unselect conflicting options or re-select among a subset of relevant options to render the unavailable option available without losing the context of the current selection screen.

14 Claims, 7 Drawing Sheets

ONE STEP SELECTION OF DISABLED OPTIONS

BACKGROUND

Selection of interrelated options through a software application is a common experience for computer users. From configuring new or existing software applications to on-line purchasing of configurable products, users make choices in many different areas. In a configurable environment, some options may conflict with others resulting in unavailable options or configurations. Different applications deal with unavailable options in differing manners.

For example, a user installing a software product may wish to select an option, but that option may be unavailable and an icon associated with the unavailable option(s) may be grayed out. Other visual clues about the unavailability may also be encountered such as specific icons, complete hiding of the options, etc. The unavailable option may become available if the user selects other options. Thus, the user wishing to use this currently unavailable option has to navigate to the other option(s), unselect them or select other options, and then navigate back and select the newly available made option. If the other options are unknown to the user, she may have to go through a trial-and-error process or read help texts to understand the acceptable configurations, which may degrade the user experience with the installation process. Similar frustrations may be experienced in on-line purchases of configurable products, services, and comparable processes.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing information associated with an unavailable option upon detecting a user's interest in that option in a configuration environment. According to some embodiments, the user may be provided information regarding why the desired option is unavailable, enabled to unselect conflicting options, re-select among a subset of relevant options to render the unavailable option available, and/or select the otherwise unavailable option in a single step without losing the context of the current selection screen. According to other embodiments, the one step selection of unavailable options may be provided in a user interface control environment, where implicitly selected options may be modified and conflicting options selected in one step.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, information associated with an unavailable option may be provided to a user upon detecting the user's interest in that option on a user interface. In addition to explaining why the desired option is unavailable, the user may be enabled to un-select a previously selected or implicitly provided option, select an alternative (compatible) option, and select the desired (but unavailable) option in one step without losing the context of the current selection screen. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a configuration environment, which may facilitate configuration of software/hardware products and services for a variety of purposes. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
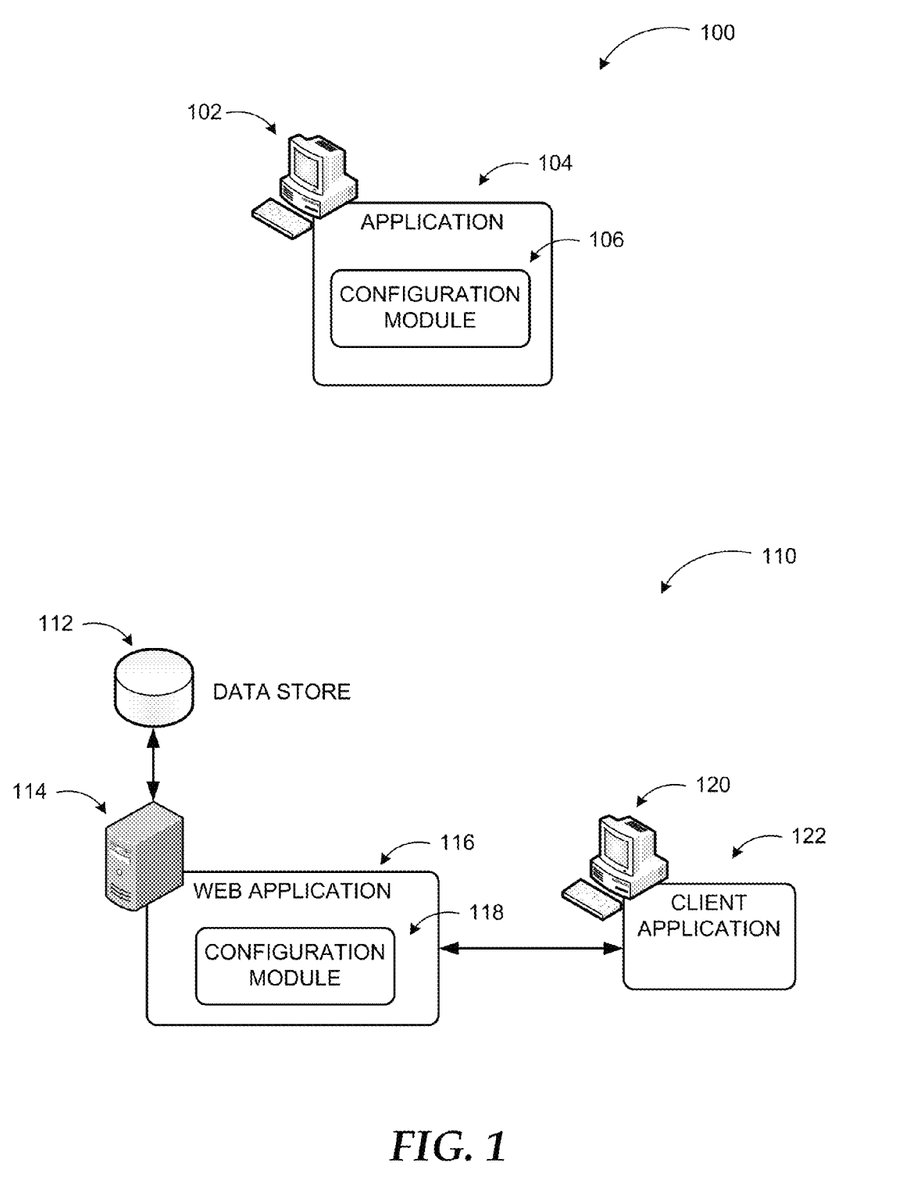
FIG. 1 includes conceptual diagrams illustrating a local and networked configuration environment, where embodiments may be implemented.

Referring to FIG. 1, conceptual diagrams 100 and 110 illustrate a local and networked configuration environment, where embodiments may be implemented. The computing devices and computing environments shown in diagram 100 are for illustration purposes. Embodiments may be implemented in various local, networked, and similar computing environments employing a variety of computing devices and systems.

Diagram 100 represents local computing environment in computing device 102, where an application 104 may enable a user to configure software/hardware products or services through configuration module 106. Computing device 102 may be any computing device including, but not limited to, desktop computers, laptop computers, servers, handheld computers, vehicle mount computers, smart phones, and comparable devices.

Application 104 may be any application capable of providing a configuration service. For example, the configuration may include setting up operational and similar parameters of the application while it is being installed, after the installation, or during removal of the application. The configuration may also involve setting up hardware components such as communication components of the computing device or another device. The configuration is not limited to parameters of application 104. Application 104 may enable configuration of parameters of another application (or device).

Configuration module 106 may perform operations associated with presenting available (and unavailable) options to a user, displaying information associated with unavailable options, and enabling the user to deselect previously selected options or select new options in order to render an unavailable option available. Configuration module 106 may be a separate application or an integrated part of application 104. Application 104 and/or configuration module 106 may control a user interface and provide suitable visual elements for the user to see information associated with available and unavailable options, make selections, etc.

Diagram 110 illustrates a networked configuration environment. In the example environment, the configuration service is provided by web application 116 and its configuration module 118 executed on server 114. Server 114 may store and retrieve data associated with the configurable options using data store 112. A user may interact with web application 116 through their client application 122 (e.g. a browsing application) executed on computing device 120. Web application 116 and configuration module 118 may operate as discussed above. The networked environment may include communications between computing device 120 and server 114 over one or more networks, which may include enterprise networks, cloud-based networks, combinations of those two, and similar ones.

The example systems in FIG. 1 have been described with specific servers, client devices, applications, and interactions. Embodiments are not limited to systems according to these example configurations. A platform providing configurable options with one step selection of disabled options may be implemented in configurations employing fewer or additional components and performing other tasks. Furthermore, specific protocols and/or interfaces may be implemented in a similar manner using the principles described herein.

Figure 2:
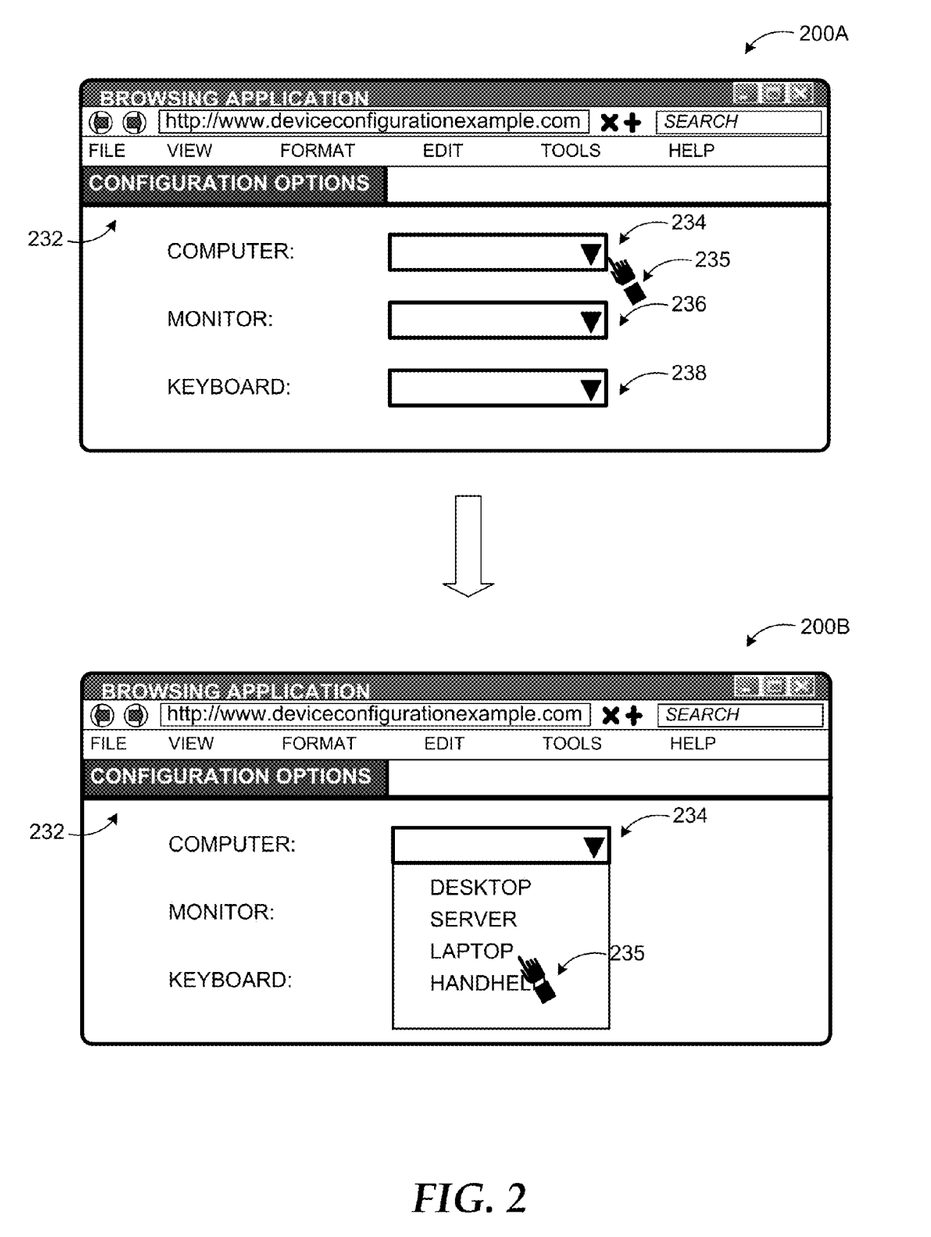
FIG. 2 illustrates screenshots of an example user interface for selecting configurable options according to embodiments.

FIG. 2 illustrates screenshots of an example user interface for selecting configurable options. Embodiments may be implemented through any application capable of providing configuration services. The browsing application user interfaces shown in screenshot 200A and 200B are for illustration purposes only. The example browsing application user interfaces include standard elements such as an address of the current web page, a search box, command menus, and a tab 232 indicating the web page provide configuration options.

The example configuration options in screenshot 200A are associated with configuring a computing device by selecting a computer, a monitor, and a keyboard. Embodiments may be implemented with any configuration system simple or complex. Further examples of configuration systems may include, but are not limited to, configuration of a software application during installation/operation/removal, configuration of a product or service during on-line purchase or after purchase, configuration of a device or system during installation/operation/disassembly, and comparable ones.

Referring back to screenshot 200A, computer options 234, monitor options 236, and keyboard options 238 may be selected by a user in any order. Once the user indicates which option they want to select first (235), a detailed list of available options under that category (e.g. computer 234) may be displayed as shown in screenshot 200B. The user may then select one of the available options (235) by clicking on the displayed option. Of course other methods of indicating a selection may also be used such as clicking on a check box or radio button, and similar ones. The option that needs to be unselected or reselected may also be placed somewhere else on the user interface, out of sight from the user looking at the user interface.

Figure 3:
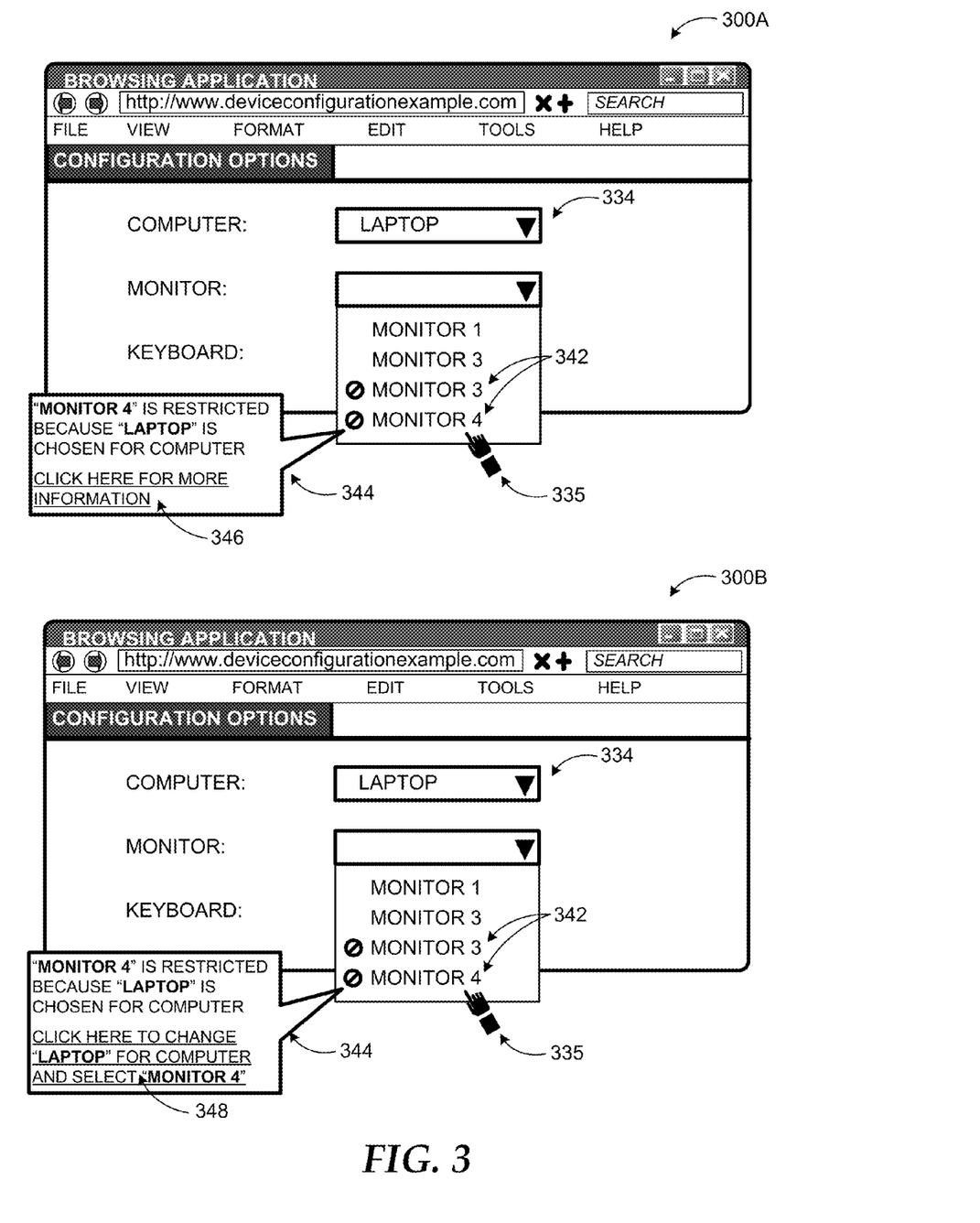
FIG. 3 illustrates further screenshots where information associated with unavailable options is provided to a user.

FIG. 3 illustrates further screenshots, where information associated with unavailable options is provided to a user. Following the example screenshots of FIG. 2, screenshot 300A illustrates one example display of information associated with an unavailable option.

In the previous screenshot, the "laptop" option (334) was selected by the user. This option may be incompatible with monitor options 3 and 4 (342) of the available monitors. Thus, when the user indicates interest in monitor option 4 (e.g. by hovering over that option or attempting to click on the displayed option) (335), hovering display box 344 may be presented indicating to the user briefly that the monitor option 4 is unavailable because "laptop" was selected for the computer category. Hovering display box 344 may further include a link 346, which when activated may provide the user with another user interface (e.g. another hovering display box) for enabling the user to unselect previously selected (conflicting) option "Laptop", select a compatible computer option, and select the desired monitor option "Monitor 4" in a single step. The new user interface may also provide additional information about the unavailability of the desired monitor option. The additional information may include detailed explanation of acceptable combinations, technical specifications of the options, and similar data. If the goal is avoiding distraction of the user, the additional information provided may be minimized.

Example screenshot 300B illustrates the same scenario as in screenshot 300A with a different hovering display box 344. In addition to the brief explanation about the conflict of options, hovering display box 344 provides an option 348 for unselecting previously selected (conflicting) option "Laptop" and selecting the desired option "Monitor 4" in a single step. In both examples, the information is provided through hovering display boxes such that the current configuration screen is preserved preventing distraction of the user and maintaining the context of the user experience.

Embodiments are not limited to software/hardware or product/service configuration applications. Some embodiments may be implemented in applications, where choices are made among available options explicitly or implicitly affecting a behavior of the application. An illustrative example of such embodiments includes the behavior of many conventional word processing or email applications. Such applications categorize textual content in groups such as "plain text", "HTML format", and similar ones. These categories are associated with enabling a user to modify attributes of textual content such as font styles, colors, shading schemes, etc. For example, "plain text" category may not allow a user to modify many of the attributes such as font styles or colors. In many applications, the text style is typically hidden in one of the control menu items and not obviously visible to the user. If the user is working with a document (e.g. responding to an email), where the choice has already been made (e.g. "plain text" selected) by the previous author of the document, the controls associated with unavailable options (e.g. changing text from regular to bold) may be inactivated (e.g. grayed). When the user attempts to select one of those restricted controls, nothing happens and no information is provided to the user. In order to render those controls available, the user would have to find the text style control in the menu selections, modify it, and then be able to change attributes. In an application according to embodiments, a user interface element may be presented to the user upon detecting his/her interest in an unavailable user interface control, where the user interface element enables the user to modify the text style selection and select the desired attribute option in one step.

Figure 4:
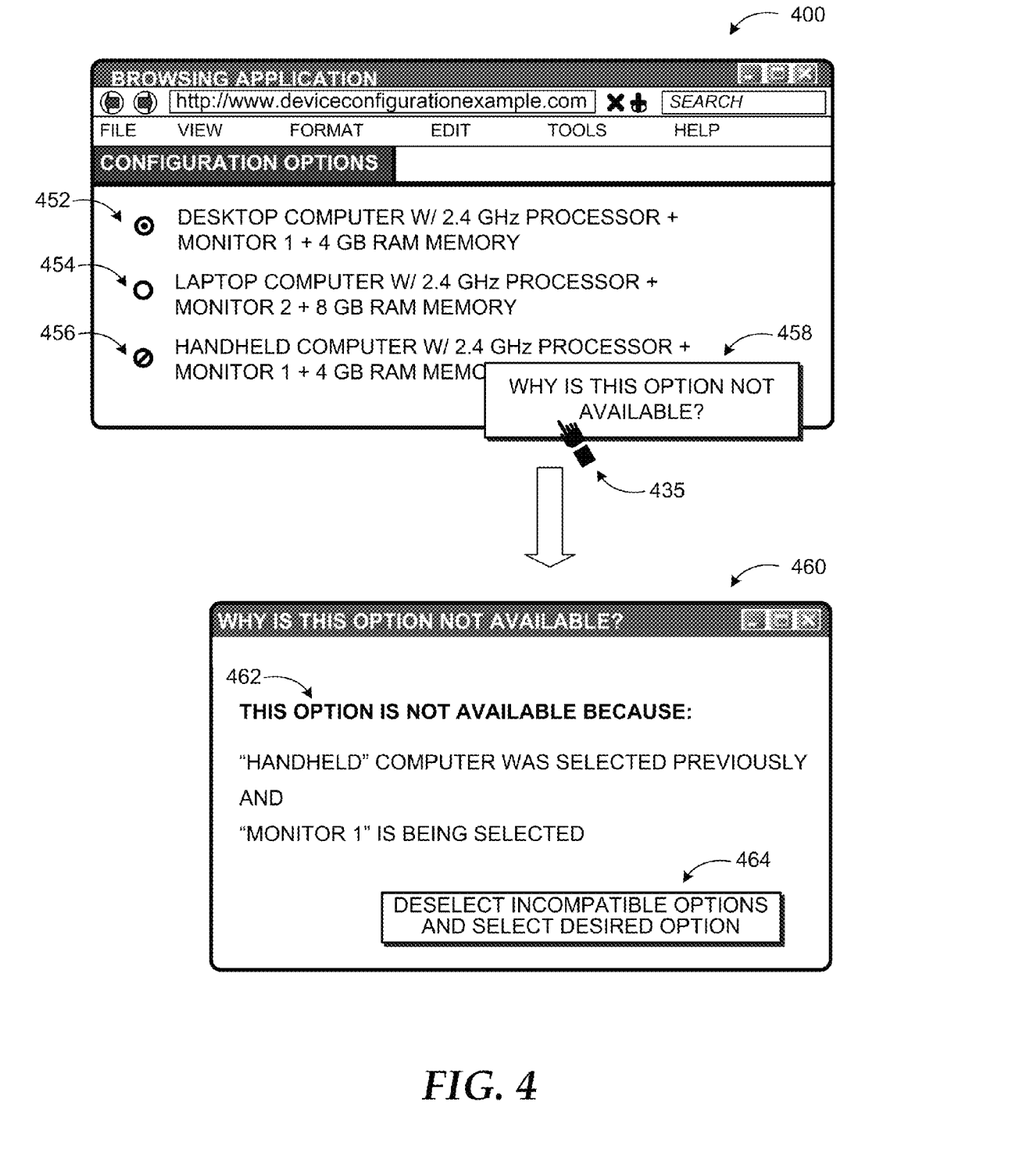
FIG. 4 illustrates screenshots of another example implementation of one step selection of disabled options according to embodiments.

FIG. 4 illustrates screenshots of another example implementation of one step selection of disabled options according to embodiments. Screenshot 400 shows a browsing application user interface with configuration options 452, 454, and 456 displayed in a different manner than the example ones of FIG. 3. In this example scenario, the options are listed on the screen with radio buttons next to them for user selection. An unavailable combination such as option 456 is indicated with a graphical icon as being unavailable. If the user hovers on that option or attempts to select it, a hovering display box 458 may be displayed indicating in a question style that the user may be able to change the selections by selecting the hovering display box 458. Of course, other forms of indication may also be used. Once the user selects hovering display box 458, a secondary user interface 460 may be presented providing a brief explanation 462 as to why the option is not available. Secondary user interface 460 may further present a control element 464 (e.g. a button) enabling the user to deselect incompatible options and select the currently unavailable desired option.

Embodiments are not limited to providing explanation and further selection options based on incompatible configurations. According to some embodiments, unacceptable options (or configurations) based on unavailability of one or more of the options (e.g. in an on-line purchase scenario) may also be indicated as such through an information user interface.

A user interface displaying information associated with unavailable options may employ a variety of textual, graphical, color, shading, and comparable schemes to emphasize different aspects. For example, previously selected options may be presented in a different color or shading than the remaining text.

The examples in FIG. 2 through 4 have been described with specific user interface elements, configurations, and presentations. Embodiments are not limited to systems according to these example configurations. One step selection of disabled options may be implemented in configurations using other types of user interface elements, presentations, and configurations in a similar manner using the principles described herein.

Figure 5:
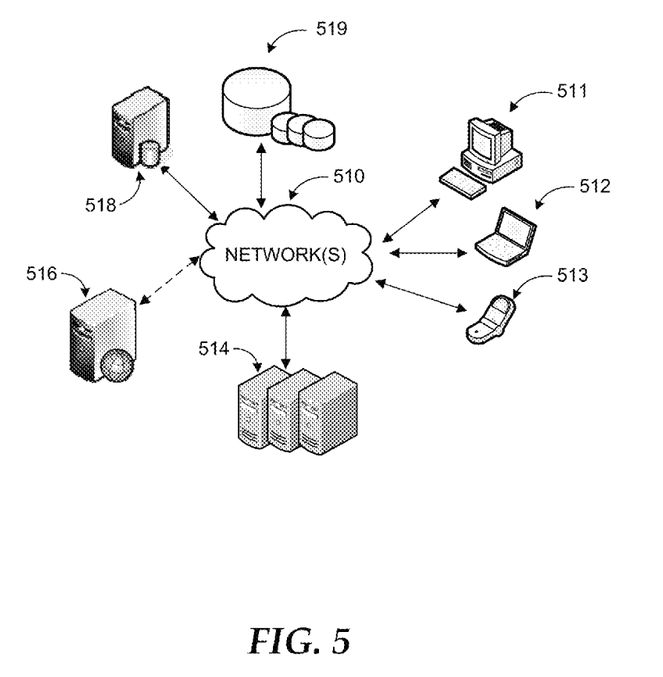
FIG. 5 is a networked environment, where a system according to embodiments may be implemented.

FIG. 5 is an example networked environment, where embodiments may be implemented. A system providing configurable options to a user with one step selection of unavailable options may be implemented via software executed over one or more servers 514 such as a hosted service. The platform may communicate with client applications on individual computing devices such as a smart phone 513, a laptop computer 512, or desktop computer 511 (client devices') through network(s) 510.

Client applications executed on any of the client devices 511-513 may facilitate communications via application(s) executed by servers 514, or on individual server 516. A configuration application executed on one of the servers may facilitate selection of available options for software/hardware products/services. The application may provide information associated with unavailable options and enable users to deselect previously selected options or select new options to render an unavailable option available as discussed previously. Furthermore, any software application control user interface with options may implement a one step deselection and reselection process as described herein. The configuration application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing configuration services with one step selection of disabled options. Furthermore, the networked environments discussed in FIG. 5 are for illustration purposes only. Embodiments are not limited to the example applications, modules, or processes.

Figure 6:
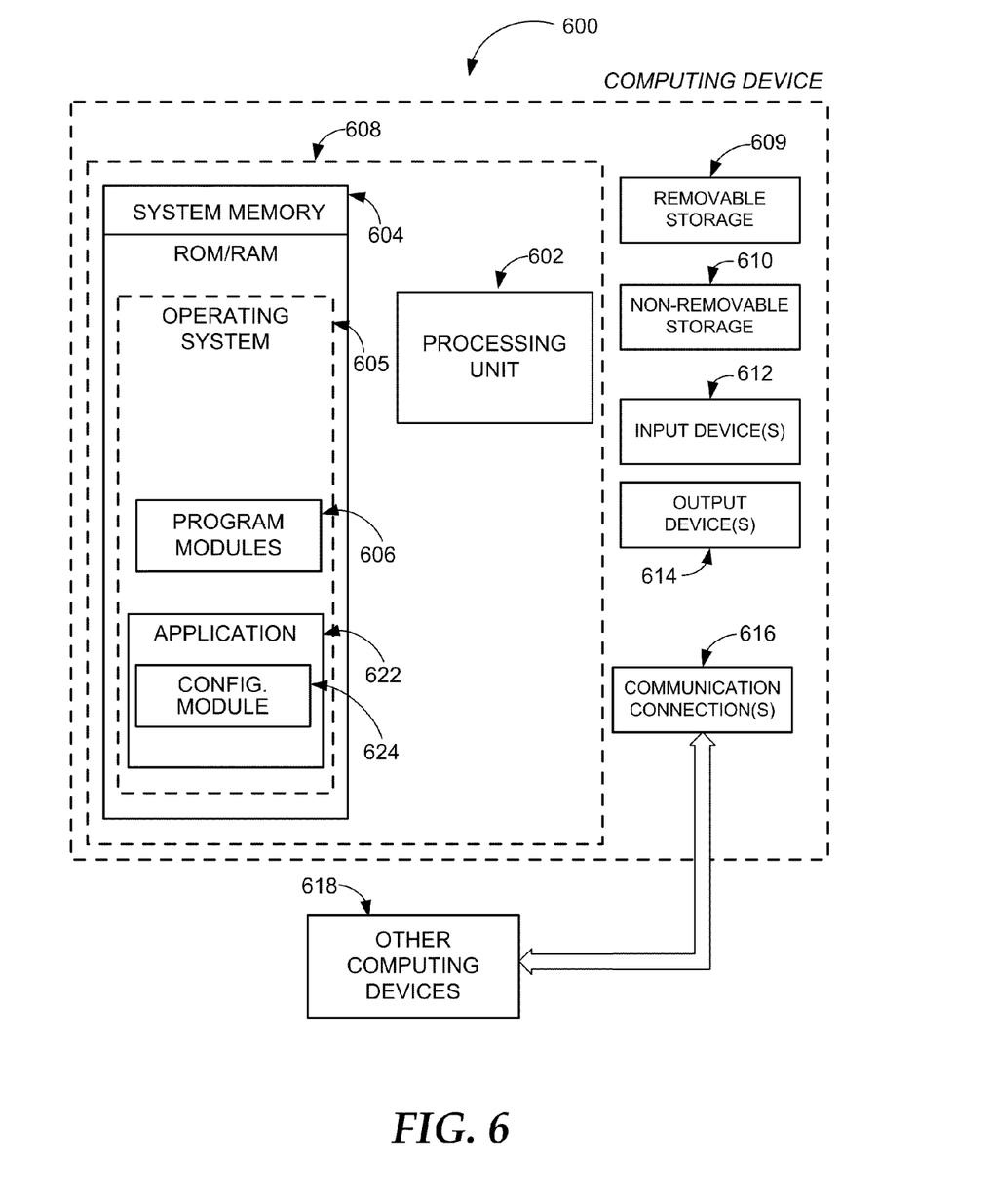
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of configuring software/hardware systems, user interfaces, and components according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, and configuration module 624.

Application 622 may enable users to define/select options for a configurable product or service. Through a user interface controlled by configuration module 624, application 622 may display information associated with unavailable options, enable a user to navigate to previously selected options in order to deselect them such that the unavailable option is rendered available. All this may be accomplished while a context of current selection is preserved. Application 622 and configuration module 624 may be separate application or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
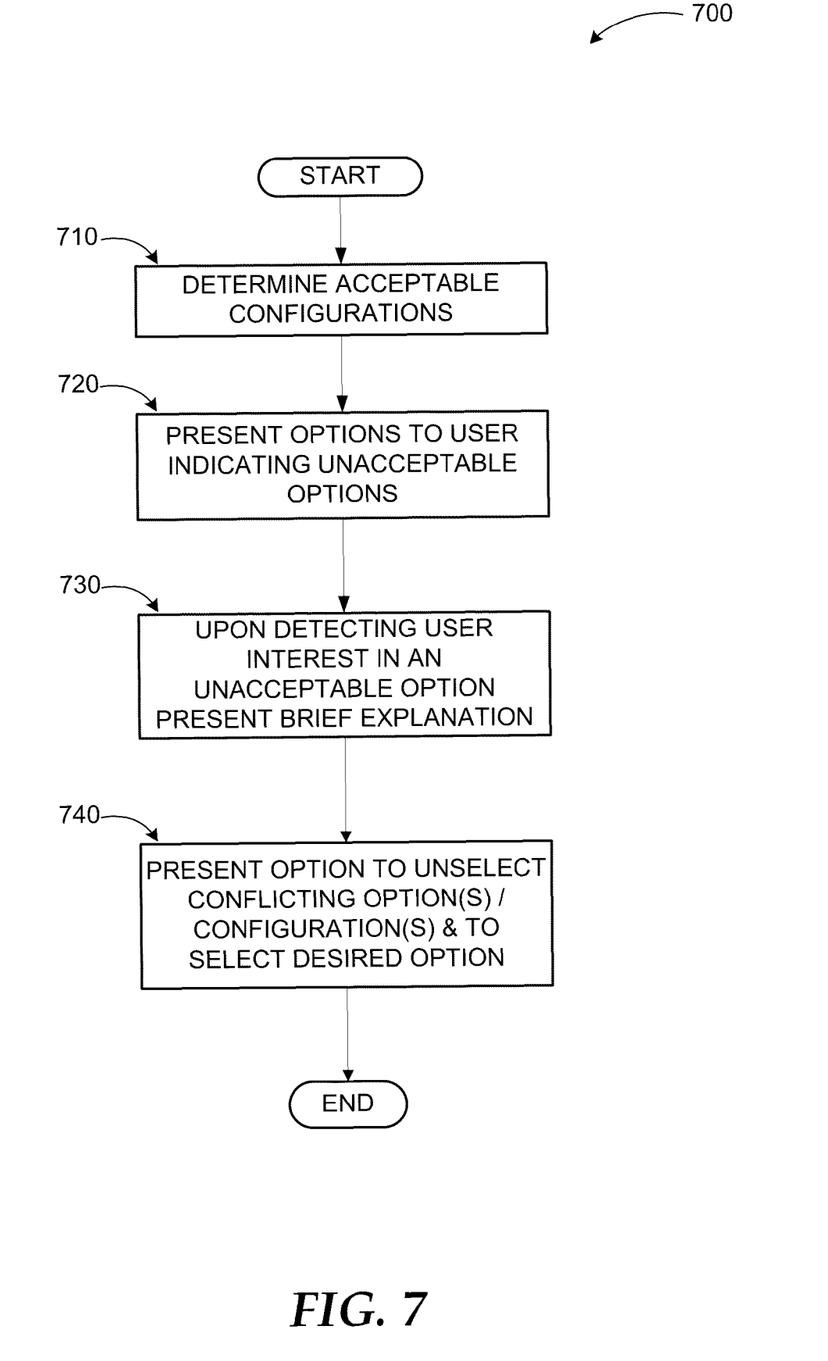
FIG. 7 illustrates a logic flow diagram for a process of providing information associated with unavailable options and enabling a user to deselect conflicting options according to embodiments.

FIG. 7 illustrates a logic flow diagram for process 700 of providing information associated with unavailable options and enabling a user to deselect conflicting options according to embodiments. Process 700 may be implemented on a server or other computing device.

Process 700 begins with operation 710, where acceptable configurations are determined. Determining acceptable configuration may entail figuring out incompatible options when others are selected, determining otherwise unavailable options, or determining user interface controls that may be inactivated due to selection of a user interface behavior option (implicitly or explicitly). At operation 720, available options may be presented to a user while indicating unacceptable options by partially or completely hiding the unacceptable options, providing a visual clue (textual or graphical), and comparable methods.

At operation 730, brief information associated with unacceptable (or unavailable) options may be presented to the user upon detecting the user's interest in one of those options. For example, the user may hover over one of those options or try to select one of them. The information may include a brief explanation as to why the option is unavailable (e.g. conflict with a user interface configuration, conflict with a previously selected option, unavailability of a product or service, etc.). The information may be presented through a pop-up window, a hovering box, or similar user interface element such that the context of the selection screen is not lost and the user is not distracted.

At operation 740, an opportunity to unselect a conflicting or incompatible option (or configuration) may be provided along with the opportunity to select the option of interest in one step. For example, a button or a check box may be provided performing both operations together. The one step deselection/selection opportunity may be provided, according to some embodiments, on the same user interface element as the brief explanation information.

The operations included in process 700 are for illustration purposes. One step selection of disabled options may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for selecting configurable options, the method comprising:

determining acceptable configurations of available options;

presenting the available options to a user through a first user interface;

upon receiving a user selection of one or more options on the first user interface, indicating at least one unacceptable option to the user employing one of: a textual scheme, a coloring scheme, a shading scheme, or a graphical element;

upon detecting the user's interest in the at least one unacceptable option, presenting an explanation of a reason of unacceptability on a second user interface, wherein the second user interface enables activation of a third user interface; and presenting a detailed explanation of the reason of unacceptability on the third user interface and a control for enabling the user to deselect one or more previously selected options incompatible with the unacceptable option rendering the at least one unacceptable option acceptable and select a configuration that includes the at least one unacceptable option in one step through the third user interface; and upon detecting the user's selection of the control on the third user interface, rendering the at least one unacceptable option acceptable and selecting the acceptable rendered option in one step, wherein the third user interface is presented such that a context of a current selection view is preserved.

2. The method of claim 1, further comprising:

presenting the secondary user interface as one of a hovering display box and a pop-up window such that a context of a current selection view is preserved.

3. The method of claim 1, wherein enabling the user to deselect one or more incompatible options includes enabling the user to re-select among previously selected options in the secondary user interface in one step.

4. The method of claim 1, wherein enabling the user to deselect one or more incompatible options includes presenting a control element comprising one of a button, a check box, or a radio button to deselect incompatible options and select the acceptable rendered option automatically.

5. The method of claim 1, wherein indicating the at least one unacceptable option to the user includes employing one of: a textual scheme, a coloring scheme, a shading scheme, or a graphical element.

6. The method of claim 1, wherein the configurable options are associated with at least one from a set of: configuration of a software application during one of: installation, operation, or removal; configuration of one of a product or a service during an on-line purchase; configuration of a device during one of: installation, operation, or disassembly; or controls of a user interface.

7. The method of claim 6, wherein the configurable options are associated with the controls of the user interface and the controls of the user interface are associated with one of a word processing application or an email application.

8. The method of claim 1, wherein detecting the user's interest in the at least one unacceptable option includes one of: detecting a mouse-over on the unacceptable option or detecting an attempt by the user to select the unacceptable option.

9. The method of claim 1, wherein the user is enabled to deselect one or more of the incompatible options in a third user interface activated through the secondary user interface.

10. A computing device for providing selection of configurable options, the computing device comprising:

a memory;

a processor coupled to the memory, the processor executing an application presenting a first user interface for enabling a user to select configurable options, wherein the application is configured to:

determining acceptable configurations of available options;

presenting the available options to a user through the first user interface;

upon receiving a user selection of one or more options on the first user interface, indicating at least one unacceptable option to the user employing one of: a textual scheme, a coloring scheme, a shading scheme, or a graphical element;

upon detecting the user's interest in the at least one unacceptable option, presenting an explanation of a reason of unacceptability on a second user interface, wherein the second user interface enables activation of a third user interface; and presenting a detailed explanation of the reason of unacceptability on the third user interface and a control for enabling the user to deselect one or more previously selected options incompatible with the unacceptable option rendering the at least one unacceptable option acceptable and select a configuration that includes the at least one unacceptable option in one step through the third user interface; and upon detecting the user's selection of the control on the third user interface, rendering the at least one unacceptable option acceptable and selecting the acceptable rendered option in one step, wherein the third user interface is presented such that a context of a current selection view is preserved.

11. The computing device of claim 10, wherein the control is a button.

12. The computing device of claim 10, wherein the control is a navigation link for activating yet another user interface enabling the user to replace an incompatible option with a compatible option and select the acceptable rendered option in one step.

13. The computing device of claim 10, wherein the computing device is a server and the application is a web application presenting the user interface to the user through a browsing application executed on a client computing device.

14. The computing device of claim 10, wherein the computing device is one of: a desktop computer, a laptop computer, a handheld computer, a vehicle mount computer, or a smart phone.

* * * * *